United States Patent Office 3,477,359
Patented Nov. 11, 1969

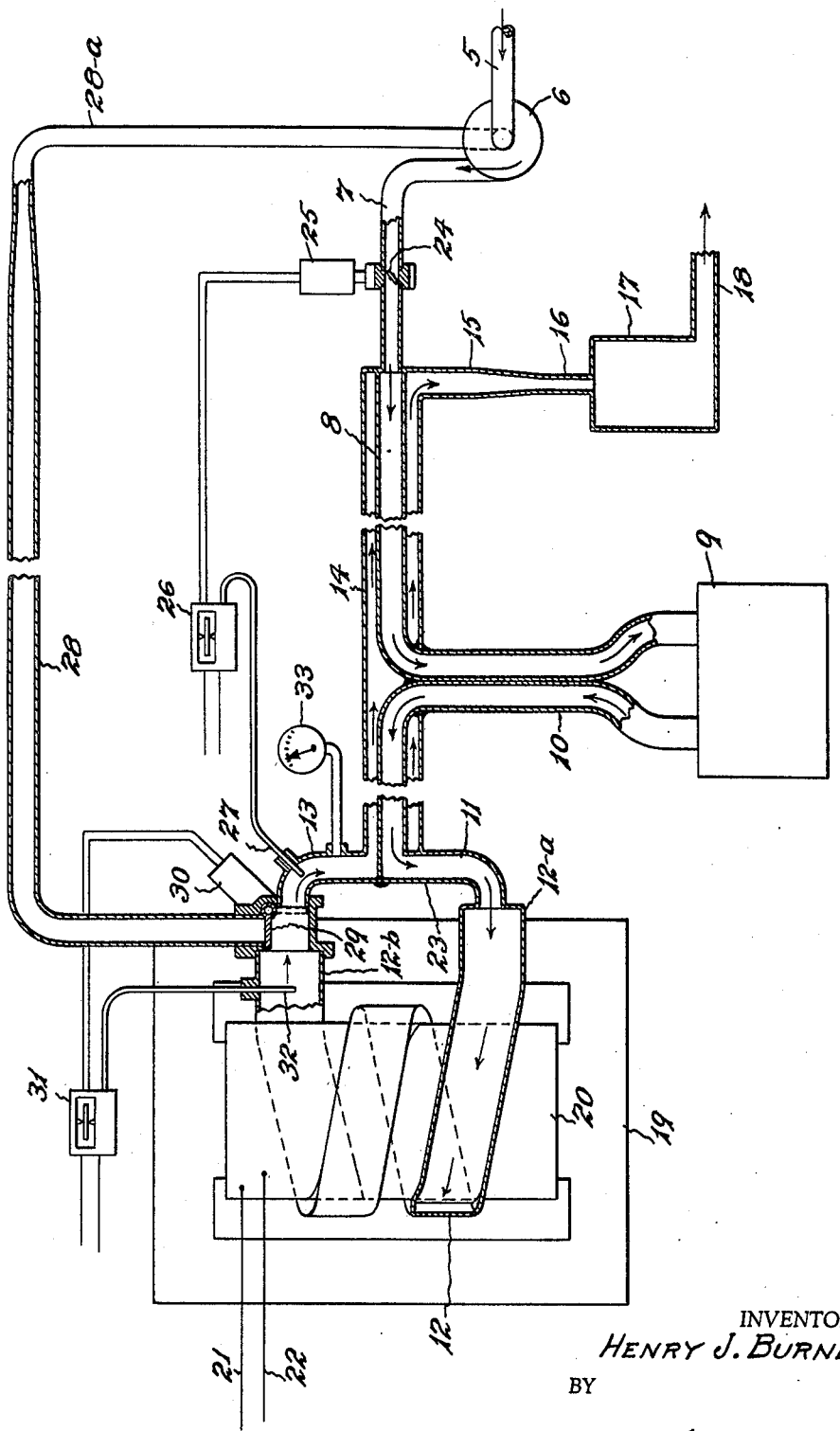

3,477,359
APPARATUS FOR HEATING FLUID
Henry J. Burnett, 55 Glenbrook Road,
West Hartford, Conn. 06107
Filed June 8, 1965, Ser. No. 462,312
Int. Cl. A23c 9/00; B65b 55/06
U.S. Cl. 99—252                          12 Claims

ABSTRACT OF THE DISCLOSURE

An apparatus for sterilizing a continuous flow of a fluid, such as milk, in such a manner that it will keep in good condition for a long period of time without refrigeration; said apparatus being adapted to quickly heat the fluid by electrical induction to a sterilizing temperature and then quickly cool said fluid without causing cooking or burning thereof.

---

This invention relates particularly to a milk sterilizing apparatus, more particularly, to a continuous flow apparatus for sterilizing milk in such a manner that it will keep in good condition without refrigeration for a long period of time.

It is well known that when a fluid such as milk is pasteurized it is heated to a temperature of approximately 141° F. for a time period of ½ hour, or 175° F. for approximately 16 seconds. This kills enough of the bacteria in the milk to render it safe for human consumption but some of the bacteria still remains and therefore refrigeration is required and it will only preserve the milk for a few days.

When the milk is heated to a temperature above its boiling point, of approximately 215° F., all of the bacteria is killed and the milk is rendered sterile and will therefore keep for a long period of time without refrigeration.

Heretofore, attempts have been made to sterilize milk by heating it to a temperature of approximately 270° F. for a period of time of 2 to 5 seconds. Milk so heated has become sterile and has kept in safe condition without refrigeration for at least six months. However, such sterile milk has had a burnt taste which is believed due to the long time period, through which the milk was subjected to the high temperature, causing the milk to burn.

It is therefore very important that the milk be prevented from burning in the sterilizing process and it is also important that it be prevented from cooking since this would cause it to jell or otherwise change its consistency.

An object of this invention, therefore, is to provide for sterilizing milk by heating it to a higher temperature, so as to kill all of the bacteria, but to shorten the time period through which the high sterilizing temperature is maintained so as to prevent burning or cooking of the milk and thereby eliminating the burnt taste.

A further object is to provide novel means for quickly heating milk to the high temperature required for complete sterilization and then quickly cooling the milk to prevent it from being cooked or burned.

A still further object is to provide means for heating the milk by electrical induction so that it will be heated to a sterilizing temperature almost instantaneously and thereby permit the milk to be heated and cooled within a period of time which is short enough to prevent cooking or burning of the milk.

My specification invention will be more clearly understood from the following description and the accompanying drawing in which is illustrated my improved apparatus for attaining said objects.

As shown in the drawing, the numeral 5 denotes a supply pipe from which the milk is pumped through the sterilizing apparatus by a suitable pump 6 which forces the milk through an inlet pipe 7 into a pipe 8 that conducts the milk into a suitable homogenizing unit 9. From said unit, the milk is forced progressively through a pipe 10, a manifold portion 11, a tubular heating coil 12, a manifold portion 13, an outlet pipe 14 and a return pipe 15 having a pressure reducing portion 16 leading into a velocity reducing and cooling chamber 17 having an outlet pipe 18.

The coil 12 is the secondary coil of a transformer 19 and is wound around a primary coil 20 which is energized through electric current supply conductors 21–22. Said secondary coil 12 is short-circuited for instantaneous acceleration of temperature by electrical induction heating between the inflow and outflow points 12–a and 12–b respectively, of the said coil 12 which is short-circuited by the manifold 23 in which the portions 11 and 12 thereof are joined together.

The said coil 12 is therefore hottest between its inlet and outlet ends and the portions 11 and 13 are heated from said coil by conduction and by the short-circuiting current supplied by coil 12.

In the use of said apparatus, cold raw milk is forced through the pipe 8 at a rate of flow which will permit said milk to be preheated by heat transfer from the hot outgoing sterilized milk in the outlet pipe 14, which surrounds the pipe 8, to a temperature of approximately 135° F. to suit the homogenizing process which takes place in the homogenizing unit 9. The milk passes from said unit through the pipe 10 wherein it is further heated by the outgoing hot milk and conduction from the heating coil 12 to below cooking temperature of approximately 200° F. in the manifold portion 11. As the said milk passes through the coil 12, its temperature is quickly raised to a sterilizing temperature of approximately 285° F. and the rate of flow of said milk through the coil 12 is controlled so that it will be heated to said sterilizing temperature and cooled to a below cooking and burning temperature within a time period of 1 second or less as it passes through said secondary coil and the pipe 14 and is cooled by contact with the pipes 10 and 8 therein and heat transfer to the ingoing cold milk contained in said pipes.

From the pipe 14 the milk passes through the outlet tube 15 into the chamber 17 from which it may be drawn out as desired.

The portions of the pipes 8, 10 and 14 between the heating coil 12 and the homogenizing unit 9 and between the said unit and the chamber 17 constitute an efficient heat exchanger and may be of any length required to permit the necessary amount of heat transfer between the ingoing cold milk in the pipes 8 and 10 and the outgoing hot milk in the surrounding pipe 14 to heat the cold ingoing and cool the hot outgoing milk to the required temperatures.

It will be noted that the tubing forming the heating coil 12 is cross-sectionally flattened to provide a cross-sectionally rectangular very thin or narrow passage which will cause the milk to pass in close proximity to the hot walls of said tubing and thereby greatly accelerating the transfer of heat from the tubing to the milk and the heating of said milk to the sterilizing temperature.

In order to control the flow and temperature of the milk, as it passes through said apparatus, I provide a suitable through valve 24 which is operated by a motor 25 that is connected to a suitable temperature control and indicator 26 that is responsive, through a sensing element 27, to the temperature of the outgoing milk in the portion 13.

I also provide, at the outlet end of the coil 12, a diversion pipe 28 having a pressure reducing portion 28–a, connected to the inflow side of the pump 6, and a diversion valve 29 which normally closes the portion 13 and is operated by a motor 30 connected to a control 31 that is responsive, through a sensing element 32, to the temperature of the milk as it leaves the heating coil 12.

The operation of said apparatus is as follows:

In order to prevent the discharge of milk from the apparatus before it is heated to a sterilizing temperature, the diversion valve 29 is normally in position to close the portion 13 and open the diversion pipe 28, as indicated in dotted lines in the drawing. During the initial operation of the apparatus the milk will be heated by the coil 12 and then pass through the outlet end 12–b of said coil where it will contact the sensing element 32. It will then pass through the open diversion pipe 28 into the pump 6 and be repumped through the apparatus. When the temperature of said milk reaches 285° F., the diversion valve 29 will open the portion 13 and close the diversion pipe 28, as shown in full lines in the drawing, and the milk will then pass through the apparatus in its normal course, which is indicated by the arrows.

The temperature of the milk is also controlled by the through valve 24 which regulates the rate of flow of said milk to maintain the required temperature as it passes the sensing element 27. A pressure gauge 33 is preferably provided to visually indicate the pressure of the milk as it passes through the manifold portion 13.

It will be understood from the foregoing description that my invention provides a novel apparatus for sterilizing milk by almost instantaneously heating it to a high bacteria killing temperature and then quickly cooling it to a below burning or cooking temperature, all within a period of time which is sufficiently short to prevent burning or cooking of the milk.

I claim:

1. In an apparatus for sterilizing milk, an electric transformer having a primary coil, a short-circuited secondary tubular coil around said primary coil for heating milk by electrical induction, a pump for forcing said milk through said short-circuited coil, and means for cooling said milk, said secondary coil and cooling means being adapted to heat said milk to a sterilizing temperature and cool it to a below cooking temperature within a period of time sufficiently short to prevent cooking of said milk.

2. An apparatus for sterilizing milk as set forth in claim 1 wherein said secondary coil is constructed of flattened tubing to provide a cross-sectionally narrow passage therethrough for accelerating the transfer of heat from said tubing to the milk therein.

3. The subject matter set forth in claim 1 including a through valve responsive to the temperature of the milk to vary the rate of flow thereof through said apparatus.

4. The subject matter set forth in claim 1 including a diversion pipe between said secondary coil and pump, and a diversion valve adjacent the outlet end of said secondary coil for diverting milk from the secondary coil to the pump and responsive to the temperature of said milk for closing said diversion pipe upon the milk being heated to a predetermined temperature.

5. The subject matter set forth in claim 1 including a diversion pipe between said secondary coil and pump, a diversion valve for diverting insufficiently heated milk through said diversion pipe, and means responsive to the temperature of milk at the outlet end of said secondary coil for controlling said valve.

6. In an apparatus for heating fluid, a heating means, a pump for forcing said fluid through said heating means, an outlet pipe leading from said heating means, a diversion pipe leading from said heating means to said pump, and a diversion valve normally closing said outlet pipe and responsive to the temperature of the fluid to open said outlet pipe and close said diversion pipe upon the fluid being heated to a predetermined temperature.

7. An apparatus for heating fluid including an electric transformer having a primary coil and a short-circuited tubular secondary coil around said primary coil, means supplying electric current to said transformer, an inlet pipe for conducting fluid to said secondary coil, and an outlet pipe for conducting said fluid from said secondary coil; said outlet pipe surrounding the inlet pipe whereby hot fluid in said outlet pipe is in heat transfer relation with cooler fluid in said inlet pipe to thereby cause cooling of the hot fluid in the outlet pipe and heating of the cooler fluid in the inlet pipe.

8. An apparatus as set forth in claim 7 including a diversion pipe leading from the outlet end of said secondary coil to said pump, and a diversion valve responsive to the temperature of the fluid at the outlet end of the secondary coil for operating said diversion valve to divert the fluid through said diversion pipe when said fluid is below a predetermined temperature.

9. An apparatus for heating fluid including an electric transformer having a primary coil, a secondary tubular coil surrounding said primary coil, an electric current supply for said primary coil, a manifold having an inlet and an outlet portion connected to the inlet and outlet ends of said secondary coil, respectively, and thereby short-circuiting same, a homogenizing unit, an inlet pipe leading to said homogenizing unit, an inlet pipe leading from said unit to the inlet end portion of said manifold, an outlet pipe connected to the outlet portion of said manifold and containing said inlet pipes whereby fluid in said outlet pipe is in heat transfer relation with the fluid in said inlet pipes, a pump for forcing fluid through said apparatus, a through valve controlling the flow of said fluid, and means responsive to the temperature of said fluid at the outlet end of said secondary coil for operating said through valve.

10. An apparatus for heating fluid including an electrical transformer having a primary coil, a secondary coil surrounding said primary coil, and constructed of flattened tubing forming a cross-sectionally narrow passage to accelerate heating of fluid passing through said secondary coil, a source of electric current for said transformer, a manifold having inlet and outlet portions connected to the inlet and outlet ends of said secondary coil, respectively, and thereby short-circuiting same to cause heating thereof by electrical induction, a homogenizing unit, a pump, a fluid supply pipe leading to said pump, an inlet pipe between said pump and unit, an inlet pipe leading from said unit to the inlet portion of said manifold for conducting fluid into the inlet of said secondary coil to be heated thereby, an outlet pipe connected to the outlet portion of said manifold and surrounding said inlet pipes for transfer of heat between the ingoing and outgoing fluid in said inlet and outlet pipes, and a pressure reducing pipe leading from said outlet pipe.

11. An apparatus as set forth in claim 10 wherein said pressure reducing pipe is connected to a velocity reducing chamber having a discharge pipe leading therefrom.

12. The subject matter set forth in claim 11 including a high pressure diversion pipe leading from the outlet end of said secondary coil and having a pressure reducing portion connected to said pump, and a diversion valve normally closing said outlet pipe for diverting fluid from said secondary coil to the pump, said diversion valve being responsive to the temperature of fluid at the outlet end of said secondary coil to open said outlet pipe and close the diversion pipe upon the fluid reaching a sterilizing temperature.

References Cited

UNITED STATES PATENTS

| 1,765,550 | 6/1930 | Tuyl | 99—253 |
| 2,273,037 | 2/1942 | Hothersall | 99—252 X |
| 2,550,584 | 4/1951 | Mittelmann | 99—253 |

ROBERT W. JENKINS, Primary Examiner

U.S. Cl. X.R.

99—212